(12) United States Patent
Yamada et al.

(10) Patent No.: US 8,573,251 B2
(45) Date of Patent: Nov. 5, 2013

(54) FLOW RATE CONTROL VALVE (75) Inventors: Hirosuke Yamada, Tsukubamirai (JP);
Sanae Nakamura, Toride (JP); Akira Kuribayashi, Meguro-ku (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/389,557

(22) PCT Filed: Aug. 27, 2009

(86) PCT No.: PCT/JP2009/064931
§ 371 (c)(1),
(2), (4) Date: Feb. 8, 2012

(87) PCT Pub. No.: WO2011/024275
PCT Pub. Date: Mar. 3, 2011

(65) Prior Publication Data
US 2012/0174997 A1 Jul. 12, 2012

(51) Int. Cl.
*F16K 37/00* (2006.01)
(52) U.S. Cl.
USPC ........... 137/553; 137/555; 137/551; 251/318; 251/366; 166/264; 166/270; 166/271; 166/277; 166/303
(58) Field of Classification Search
USPC ............... 251/318, 366; 137/551, 555, 556.3, 137/556.6, 553; 116/264, 270, 271, 277, 116/303
See application file for complete search history.

(56) References Cited

U.S. PATENT DOCUMENTS 4,430,816 A * 2/1984 Seton et al. .................. 40/638
6,718,804 B1 * 4/2004 Graves et al. ................ 70/177

FOREIGN PATENT DOCUMENTS

| JP | 60 164187 | 10/1985 |
| JP | 60 167872 | 11/1985 |
| JP | 1 128080 | 8/1989 |
| JP | 5 22967 | 3/1993 |
| JP | 3042624 U | 8/1997 |
| JP | 2001-027163 | 1/2001 |
| JP | 2001 141090 | 5/2001 |
| JP | 2004 68842 | 3/2004 |
| JP | 2004 257522 | 9/2004 |
| JP | 2005-226808 | 8/2005 |

OTHER PUBLICATIONS

International Search Report Issued Sep. 29, 2009 in PCT/JP09/64931 Filed Aug. 27, 2009.
Korean Office Action issued Mar. 8, 2013 in Patent Application No. 10-2012-7005088 with Partial English Translation.
Office Action mailed Aug. 20, 2013 in Japanese Patent Application No. 2011-528557 with partial English translation.

* cited by examiner

*Primary Examiner* — John K Fristoe, Jr.
*Assistant Examiner* — Marina Tietjen
(74) *Attorney, Agent, or Firm* — Oblon, Spivak, McClelland, Maier & Neustadt, L.L.P.

(57) ABSTRACT

A flow rate control valve, wherein the flow rate control valve is provided with a first circular tube section having first and second ports formed on a body forming the flow rate control valve, and also with a plate section mounted to the upper part of the first circular tube section through a mounting section. The plate section is provided to only one end side of the first circular tube section, is supported on the mounting section in a cantilever manner, and is formed flat.

3 Claims, 6 Drawing Sheets

FLOW RATE CONTROL VALVE

TECHNICAL FIELD

The present invention relates to a flow rate control valve, which is capable of controlling the flow rate of a fluid that flows between a pair of ports, by displacing a rod having a valve member thereon in an axial direction.

BACKGROUND ART

Heretofore, for example, a flow rate control valve has been known, which is connected through piping to a fluid pressure device such as a cylinder or the like, and which is capable of controlling the operation of the fluid pressure device by adjusting the flow rate of a fluid supplied to and discharged from the fluid pressure device.

With this type of flow rate control valve, for example as disclosed in Japanese Laid-Open Patent Publication No. 2001-141090, a tubular shaped main valve body is installed in a central portion of a cylindrical body having a linear form, the main valve body being substantially perpendicular to the longitudinal direction of the cylindrical body.

A throttle valve for adjusting the flow rate of the fluid flowing inside the cylinder body is threaded in a through-hole of the main valve body such that the throttle valve is movable back and forth. The flow rate of the fluid is adjusted by the back-and-forth operation of the throttle valve.

The above-mentioned flow rate control valve generally is disposed at a position separated from the fluid pressure device such as a cylinder or the like, and is remotely controlled. Further, often, a manifold is used, to which multiple devices are arranged in communication therewith. In this case, it is difficult to confirm operations of all of the flow rate control valves from among a plurality of flow rate control valves. Further, since such flow rate control valves frequently are formed with lateral (left/right) symmetry, it is difficult to confirm the flow direction of fluids from the exterior of the flow rate control valves.

SUMMARY OF INVENTION

A general object of the present invention is to provide a flow rate control valve, which is capable of easily and with certainty confirming the flow direction of a fluid.

The present invention is characterized by a flow rate control valve, which is capable of controlling the flow rate of a fluid that flows between a pair of ports, by displacing a rod having a valve member thereon in an axial direction, the flow rate control valve comprising the ports, which are disposed respectively on one end portion and another end portion, and a body having flow passages therein through which a fluid supplied from one of the ports flows, wherein on the body, a direction-indicating means is provided on only one of the pair of ports, so as to face toward the exterior of the body.

The above and other objects, features, and advantages of the present invention will become more apparent from the following description when taken in conjunction with the accompanying drawings in which a preferred embodiment of the present invention is shown by way of illustrative example.

DESCRIPTION OF EMBODIMENTS

Figure 4:
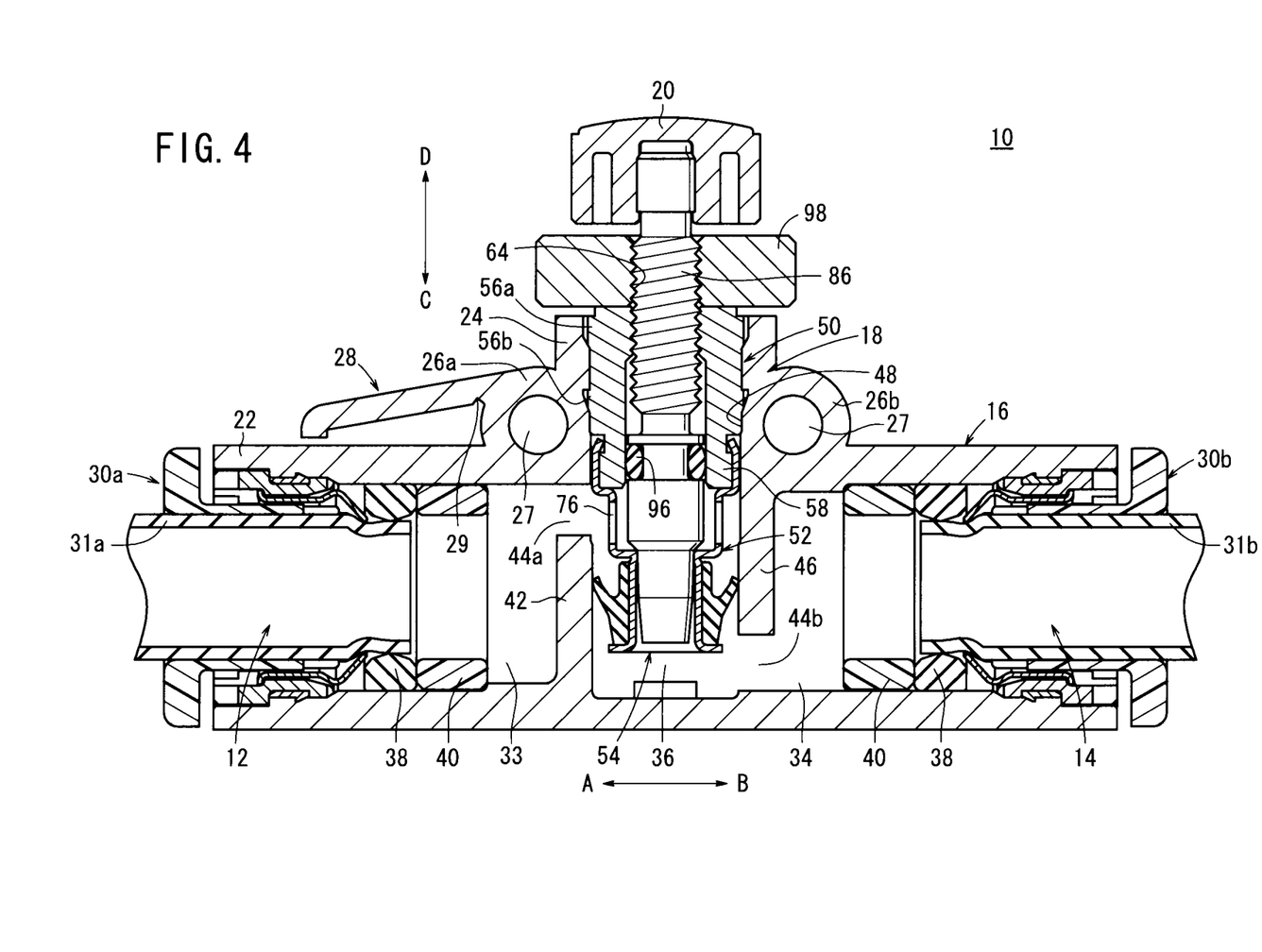
FIG. 4 is an overall vertical cross sectional view of the flow rate control valve shown in FIG. 1.
Figure 5:
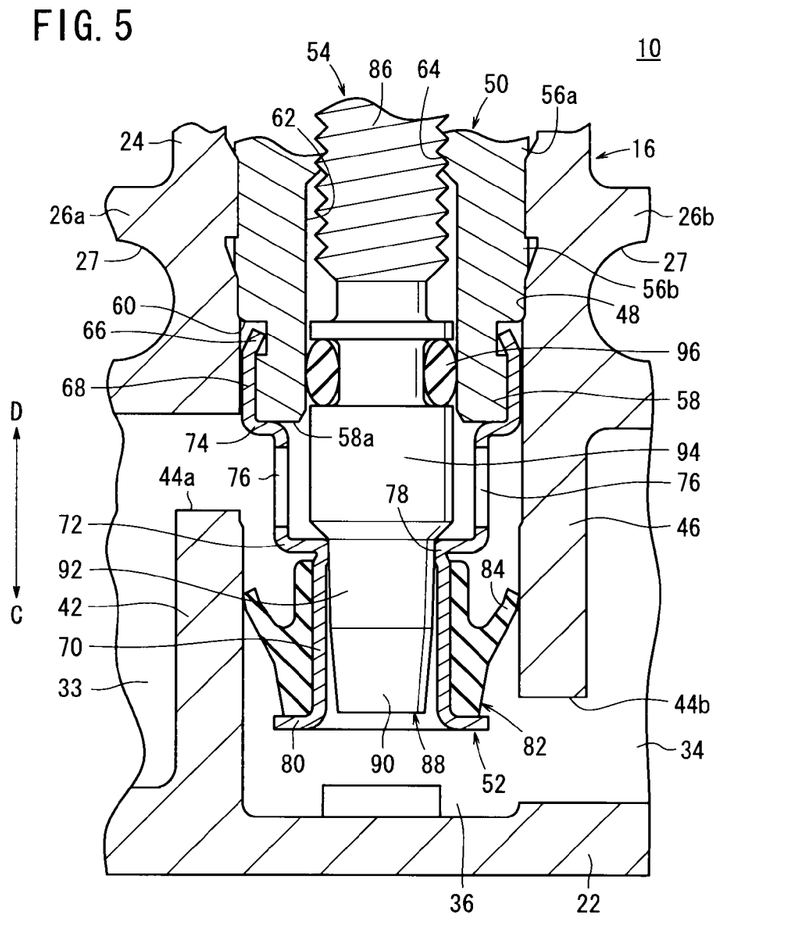
FIG. 5 is an enlarged cross sectional view showing the vicinity of a needle valve, a valve holder and a seat ring, which make up the flow rate control valve shown in FIG. 1.

As shown in FIGS. 1 to 5, the flow rate control valve 10 includes a body 16 having first and second ports 12, 14 to which a fluid is supplied and from which the fluid is discharged, a valve mechanism 18 disposed in a central portion of the body 16 for controlling the flow condition of a pressure fluid (e.g., pressurized air) that flows from the first port 12 to the second port 14, and a handle 20 for manually controlling the flow rate of the pressure fluid by the valve mechanism 18. FIG. 4 illustrates a completely closed condition in which communication between the first port 12 and the second port 14 is blocked by a needle valve (rod) 54 (discussed later) that constitutes part of the valve mechanism 18.

The body 16 includes a first cylindrical section 22 extending along a straight line, and a second cylindrical section 24 connected to a substantially central portion along an axial direction of the first cylindrical section 22. The second cylindrical section 24 is joined perpendicularly with respect to the first cylindrical section 22, extending upwardly at a predetermined height from the first cylindrical section 22. Two respective attachments 26a, 26b, which are substantially perpendicular with the axis of the first cylindrical section 22 and through which unillustrated bolts are inserted, are formed in the vicinity of an adjoined region of the first cylindrical section 22 and the second cylindrical section 24. In addition, the flow rate control valve 10 may be affixed to another non-illustrated apparatus via bolts (not shown), which are inserted through holes 27 in the attachments 26a, 26b.

A plate member 28 is disposed on one of the attachments 26a, which extends from an upper part of the attachment 26a toward one end side (in the direction of the arrow A) of the first cylindrical section 22. The plate member 28 is formed, for example, from a resin material, with a substantially rectangular flat shape having a constant thickness, which is inclined downward gradually toward a direction separating away from the attachment 26a (in the direction of the arrow A). More specifically, one end of the plate member 28 is joined so as to be at the same height as the upper part of the attachment 26a, whereas the other end thereof is positioned on an upper portion of the first cylindrical section 22 while bending toward the first cylindrical section 22 (see FIGS. 2 and 4). Stated otherwise, the plate member 28 is formed in a cantilevered fashion while being supported on only one end side thereof with respect to the attachment 26a.

Further, a cutout portion 29 is formed on the one end of the plate member 28, which is cut out with a triangular shape in cross section on a lower surface side of the plate member 28 facing the first cylindrical section 22. The cutout portion 29 is disposed at a position proximate to the attachment 26a. Additionally, on the upper surface of the plate member 28, for example, a discriminating label or the like (not shown) is pasted, which can be seen from above. Further, a number or the like, which enables discrimination without pasting a label thereon, may also be written directly on the plate member 28.

A first port 12 through which a pressure fluid is introduced opens on one end of the first cylindrical section 22, whereas a second port 14 through which the pressure fluid is discharged opens on the other end of the first cylindrical section 22. In addition, on the first and second ports 12, 14, tubes 31*a*, 31*b* are connected respectively through connection units 30*a*, 30*b* which are installed into openings of the first and second ports 12, 14.

More specifically, for example, a pressure fluid supplied through the tube 31*a* from an unillustrated pressure fluid supply source is introduced to the first port 12, and together therewith, the pressure fluid that flows through the interior of the body 16 is supplied to another pressure fluid device (e.g., a cylinder) through the tube 31*b* connected to the second port 14.

Further, a recess 32, which is formed in a substantially flat shape and is recessed from the outer circumferential surface of the first cylindrical section 22 having a circular shape in cross section, is provided on the side of the first cylindrical section 22. The recess 32 is disposed at a position downward from the second cylindrical section 24 and the attachment 26*a*, is formed substantially parallel with the axis of the first cylindrical section 22, and has a substantially rectangular shape with a fixed area. Also, on the recess 32, by writing of a JIS (Japanese Industrial Standard) symbol or the like thereon, the flow direction of the fluid in the flow rate control valve 10 can be recognized visually from the exterior.

More specifically, when observed from above the body 16, the recess 32 is disposed on one surface side only of the first cylindrical section 22 taken about the center of the second cylindrical section 24. Since the recess 32 is not disposed on the other side of the first cylindrical section 22, the installation direction of the flow rate control valve 10, as well as the flow direction of the fluid that flows through the flow rate control valve 10, can easily be confirmed due to the positioning of the recess 32.

On the other hand, first and second passages 33, 34, which extend along the axial direction (the direction of arrows A and B) from the first and second ports 12, 14, are formed in the interior of the first cylindrical section 22, together with a communication chamber 36, which is formed between the first passage 33 and the second passage 34. Ring-shaped packings 38 are mounted respectively in the first and second passages 33, 34 proximate the connection units 30*a*, 30*b*. Further, ring-shaped spacers 40 are installed respectively at positions adjacent to the packings 38.

The spacers 40 engage with steps formed in the first and second passages 33, 34 such that movement thereof toward the center of the first cylindrical section 22 is regulated and the spacers 40 are held in position thereby. Movement of the packings 38 adjacent to the spacers 40 also is regulated and the packings 38 are positioned by the spacers 40. In addition, outer surfaces of the tubes 31*a*, 31*b*, which are inserted from the first and second ports 12, 14, abut against the packings 38, so that external leakage of pressure fluid from outer circumferential sides of the tubes 31*a*, 31*b* is prevented.

Further, a first wall 42 facing the communication chamber 36 is disposed on an end of the first passage 33 perpendicular with respect to the direction in which the first passage 33 extends (the direction of arrows A and B), and the first passage 33 communicates with the communication chamber 36 through a communication passage 44*a* that opens between the first wall 42 and an inner wall surface of the first passage 33. Similarly, a second wall 46 facing the communication chamber 36 is disposed on an end of the second passage 34 perpendicular with respect to the direction in which the second passage 34 extends, and the second passage 34 communicates with the communication chamber 36 through a communication passage 44*b* that opens between the second wall 46 and an inner wall surface of the second passage 34.

The first wall 42 extends upwardly, i.e., from below to above, in the first passage 33, with the communication passage 44*a* being formed in an upper position in the first passage 33. The second wall 46 extends downwardly, i.e., from above to below, in the second passage 34, with the communication passage 44*b* being formed in a lower position in the second passage 34.

Stated otherwise, the communication passage 44*a* in the first passage 33 and the communication passage 44*b* in the second passage 34 are formed at mutually opposite positions along directions perpendicular to the axis of the first cylindrical section 22.

The communication chamber 36 is formed on the same axis as the second cylindrical section 24. A portion of the valve mechanism 18 is inserted into the interior of the communication chamber 36.

The second cylindrical section 24 opens upwardly, with a mounting hole 48 for mounting of the valve mechanism 18 therein being formed in the interior of the second cylindrical section 24 so as to extend in a vertical direction. The mounting hole 48 communicates with the communication chamber 36 of the first cylindrical section 22. Specifically, the mounting hole 48 is formed on the same axis as the communication chamber 36 of the first cylindrical section 22.

The valve mechanism 18 includes a valve holder 50, which is press-inserted with respect to the mounting hole 48 of the second cylindrical section 24, a tubular seat ring 52 mounted on a lower part of the valve holder 50, and a needle valve 54 inserted through the interior of the valve holder 50 and the seat ring 52, which is displaceable in an axial direction (the direction of arrows C and D) of the second cylindrical section 24.

The valve holder 50 is formed in a cylindrical shape, with a pair of projections 56*a*, 56*b* separated by a predetermined distance being formed on an outer circumferential surface thereof. One of the projections 56*a* is made up of knurls, for example, wherein by engagement thereof in a groove of the mounting hole 48, rotation of the valve holder 50 with respect to the second cylindrical section 24 is prevented. Further, the other projection 56*b* serves to prevent leakage of the pressure fluid between the mounting hole 48 and the valve holder 50, by engagement of the projection 56*b* in another groove of the mounting hole 48. At this time, the upper end of the valve holder 50 is mounted so as to project outward slightly with respect to the upper end of the second cylindrical section 24.

A retaining member 58, which is slightly reduced in diameter in a radial inward direction, is formed on the lower end of the valve holder 50, and a radial inwardly recessed annular groove 60 is formed on the upper end of the retaining member 58. In addition, on the retaining member 58, the seat ring 52 is installed so as to cover the outer circumferential surface of the retaining member 58. A hook 66 (described later), which is formed on an upper end of the seat ring 52, is inserted into and engages within the annular groove 60. Owing thereto, the seat ring 52 is connected integrally to the lower end of the valve holder 50.

Further, the lower end surface 58*a* of the retaining member 58 is formed with a flat shape, which is perpendicular with respect to the axis of the valve holder 50.

On the other hand, a valve hole 62 through which the needle valve 54 is inserted along the axial direction (the direction of arrows C and D) is formed with a fixed diameter inside the valve holder 50. A first screw section 64 engraved with female threads thereon is disposed on the upper end of the valve hole 62. The first screw section 64 is reduced in diameter in a radial inward direction slightly with respect to the inner circumference of the valve hole 62.

The seat ring 52 is formed by press molding, for example, from a metallic thin plate material, and is disposed inside the communication chamber 36. The seat ring 52 is constituted from a large diameter portion 68 formed on the upper portion thereof and connected to the valve holder 50, a small diameter portion 70 formed on a lower portion for seating thereon of the needle valve 54, and an intermediate portion 72 formed between the large diameter portion 68 and the small diameter portion 70. The large diameter portion 68 is formed with the largest diameter, the intermediate portion 72 is formed with a smaller diameter, which is reduced in diameter with respect to the large diameter portion 68, and the small diameter portion 70 is formed with a still smaller diameter, which is reduced in diameter with respect to the intermediate portion 72.

More specifically, the seat ring 52 is formed in a reduced diameter stepwise fashion from the upper end to the lower end thereof. Also, the aforementioned large diameter portion 68, intermediate portion 72 and small diameter portion 70 are formed mutually along the same axis.

A hook 66, which is bent at a predetermined angle in a radial inward direction, is formed on the upper end of the large diameter portion 68. When the large diameter portion 68 is press-inserted so as to cover the retaining member 58 of the valve holder 50, the hook 66 engages within the annular groove 60. Together therewith, the lower end of the retaining member 58 abuts against a stepped portion (abutment member) 74, which is disposed at a boundary region between the large diameter portion 68 and the intermediate portion 72. The stepped portion 74 is bent perpendicularly in a radial inward direction with respect to the lower end of the large diameter portion 68, and is adjoined to an upper end of the intermediate portion 72.

Owing thereto, when the seat ring 52 is installed in the retaining member 58 of the valve holder 50, the stepped portion 74 thereof becomes latched by abutment against the end of the retaining member 58, and is positioned along the axial direction (the direction of arrows C and D) of the valve holder 50.

A plurality (for example, four) communication ports 76 are formed on the intermediate portion 72 along the circumferential surface thereof perpendicular with respect to the axis of the seat ring 52, thereby enabling communication between the exterior and the interior of the intermediate portion 72. The communication ports 76 are equally space along the circumferential surface of the intermediate portion 72. The communication ports 76 are formed simultaneously with formation of the seat ring 52 by press molding. Stated otherwise, no other process steps are required for formation of the communication ports 76.

A vicinity of the adjoined region with the intermediate portion 72 projects radially inward on the small diameter portion 70, thereby forming a seat portion 78 on which the needle valve 54 can be seated. Together therewith, a flange 80, which expands in diameter in a radial outward direction, is formed on the lower end of the small diameter portion 70. Additionally, a tubular shaped sealing member 82 made from an elastic material such as rubber or the like, is installed on the outer circumferential side of the small diameter portion 70. Also, a rib 84, which is formed on the outer circumferential surface of the sealing member 82 and is inclined upwardly at a predetermined angle in a radial outward direction, abuts respectively against the first wall 42 and the second wall 46 inside the communication chamber 36.

Consequently, inside the communication chamber 36, the flow of pressure fluid, which passes between the outer circumferential side of the seat ring 52 and the first and second wall portions 42, 46, is blocked by the sealing member 82. Further, because the sealing member 82 is retained between the flange 80 and a stepped part formed at the boundary region of the intermediate portion 72 and the small diameter portion 70, the sealing member 82 is positioned without being subject to displacement in the axial direction (the direction of arrows C and D).

The needle valve 54 is formed from a shaft having a predetermined length along the axial direction (the direction of arrows C and D). The upper end of the needle valve 54 projects upwardly with respect to the upper end of the valve holder 50 and the second cylindrical section 24, and is connected to the handle 20. Further, a second screw section 86, in which threads are engraved in the vicinity of the upper end thereof, is formed on the outer circumferential side of the needle valve 54 and is screw-engaged with the first screw section 64 of the valve holder 50. Specifically, upon rotating the needle valve 54 via the handle 20, by screw-engagement with the valve holder 50, the needle valve 54 is moved in an advancing/retracting manner along the axial direction (the direction of arrows C and D).

On the other hand, on the lower end of the needle valve 54, a control member 88 is formed, which is gradually reduced in diameter toward the end thereof, and is capable of insertion into the small diameter portion 70 of the seat ring 52. The control member 88 includes a first control surface 90 disposed on the farthest distal end thereof, and a second control surface 92 formed upwardly of the first control surface 90. The first control surface 90 is set with an angle of inclination, with respect to the axis of the needle valve 54, which is greater in comparison to the angle of inclination of the second control surface 92.

Figure 1:
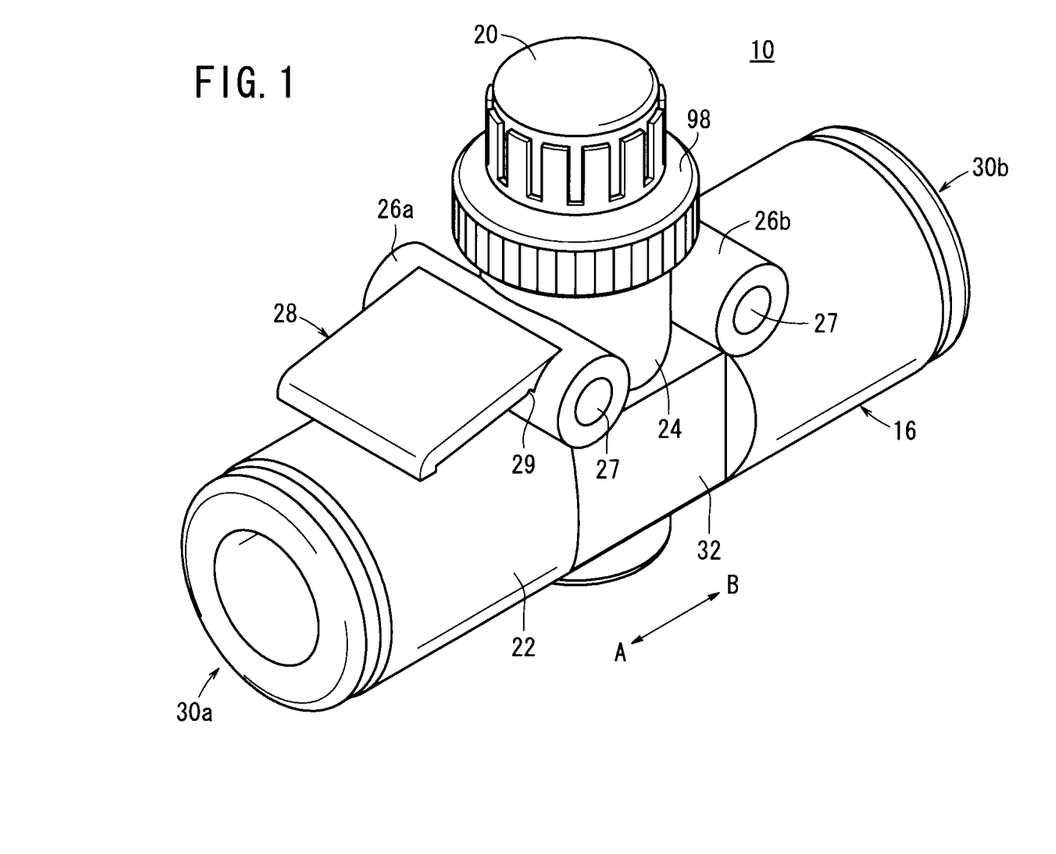
FIG. 1 is an exterior perspective view of a flow rate control valve according to an embodiment of the present invention.
Figure 2:
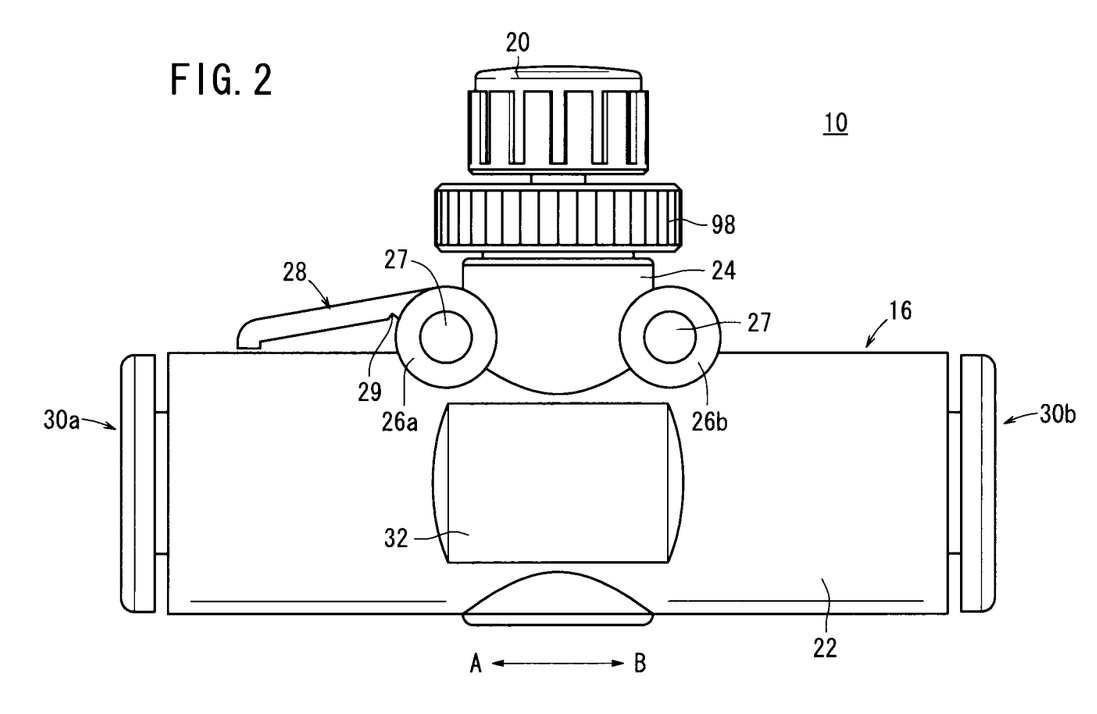
FIG. 2 is an external side view of the flow rate control valve shown in FIG. 1.
Figure 3:
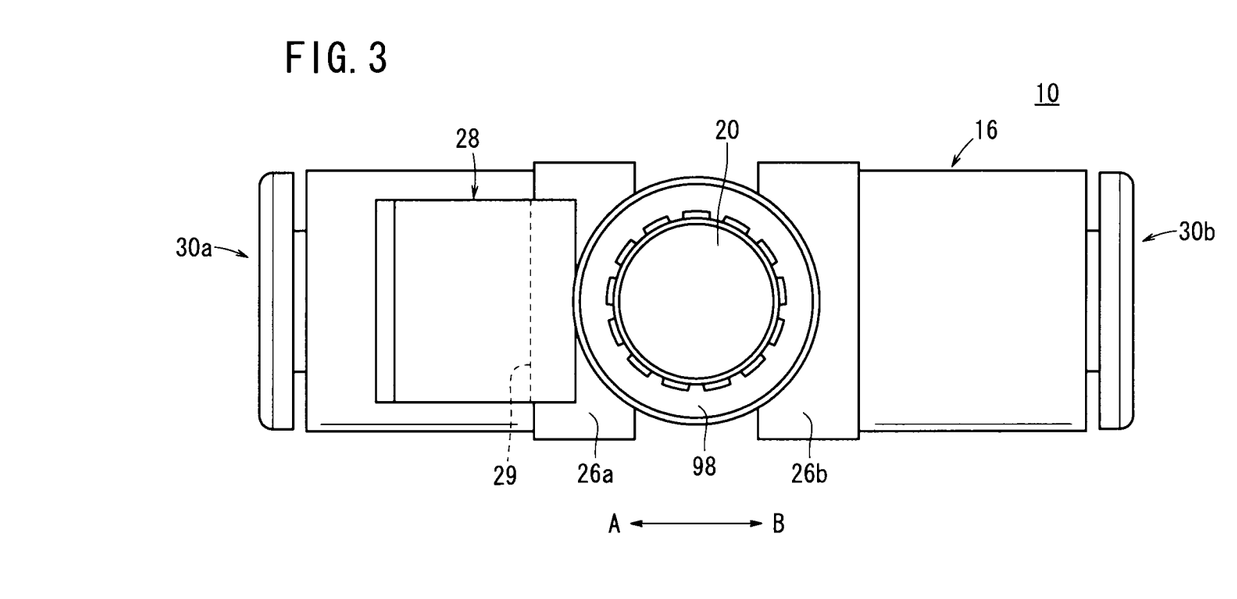
FIG. 3 is an external plan view of the flow rate control valve shown in FIG. 1.

In addition, by displacement of the needle valve 54 upwardly from the condition shown in FIG. 1, and by separation of the second control surface 92 from the seat portion 78 of the seat valve, pressure fluid passes between the seat portion 78 and the second control surface 92, and flows in the seat ring 52 toward the side of the small diameter portion 70 from the intermediate portion 72.

Further, on an upper part of the control member 88, a stopper 94 is formed, which is expanded in diameter with respect to the control member 88. An o-ring 96, which is installed on the outer circumferential surface of the stopper 94, is kept in sliding contact continuously with an inner circumferential surface of the valve hole 62 in the valve holder 50. As a result, external leakage of pressure fluid introduced to the interior of the seat ring 52 through the valve hole 62 is prevented by the o-ring 96.

In addition, when the needle valve 54 is displaced along the axial direction, the upper end of the stopper 94 is displaced along the valve hole 62 of the valve holder 50, whereupon by abutment thereof against the lower end of the radially inward projecting first screw section 64, upward displacement (in the direction of arrow D) of the needle valve 54 is regulated. Together therewith, by abutment of the lower end of the stopper 94 against a boundary region in the seat ring 52 between the small diameter portion 70 and the intermediate portion 72, downward displacement (in the direction of arrow C) of the needle valve 54 is regulated.

Further, upwardly of the second cylindrical section 24 constituting the body 16, a lock nut 98 is disposed coaxially with the second cylindrical section 24. The second screw section 86 of the needle valve 54 is screw-engaged in the center of the lock nut 98. Additionally, after the needle valve 54 has been rotated and displaced to a position at which the pressure fluid flows through the interior of the body 16 at a predetermined flow rate, by screw-rotating the lock nut 98 so as to displace the lock nut 98 to a position in abutment against the upper end of the valve holder 50, since further rotational displacement of the needle valve 54 is restricted, the flow rate controlled condition can be maintained by the needle valve 54.

The flow rate control valve 10 according to the embodiment of the present invention is basically constructed as described above. Next, operations and effects of the flow rate control valve 10 shall be explained. Herein, as shown in FIG. 1, an initial condition shall be described, in which the needle valve 54 constituting the valve mechanism 18 is lowered under a rotating action of the handle 20, and communication between the first port 12 and the second port 14 is blocked in a totally closed state by the needle valve 54.

In such an initial condition, pressure fluid is supplied to the first port 12 through the tube 31*a*, and further is supplied into the communication chamber 36 through the communication passage 44*a*. The pressure fluid introduced to the communication chamber 36 is prevented by the sealing member 82 disposed on the outer circumferential side of the seat ring 52, from flowing past the outer circumferential side of the seat ring 52 and flowing downstream to the second port 14. Additionally, after an operator (not shown) has screw-rotated the lock nut 98 and moved the same upward to release the restricted condition of rotational displacement of the needle valve 54, the handle 20 is gripped and rotated, whereby the needle valve 54 is displaced upwardly (in the direction of arrow D) while being rotated under threaded engagement of the needle valve 54 with the valve holder 50.

Consequently, from a condition in which the second control surface 92 of the control member 88 abuts against the seat portion 78, the needle valve 54 separates gradually away from the seat portion 78, and the gap between the second control surface 92 and the seat portion 78 gradually is increased. In addition, the pressure fluid introduced to the interior of the communication chamber 36 flows from the communication ports 76 of the seat ring 52 through to the interior of the seat ring 52, and flows between the seat portion 78 and the control member 88 of the needle valve 54 (in the direction of arrow C) to the side of the small diameter portion 70. At this time, the flow rate of the pressure fluid is controlled proportionally to the size of the gap between the seat portion 78 and the control member 88 of the needle valve 54. After the pressure fluid has passed the communication passage 44*b* and flowed from the interior of the communication chamber 36 to the second passage 34, the pressure fluid flows to another fluid pressure apparatus at a predetermined flow rate through the tube 31*b*, which is connected to the second port 14.

More specifically, the displacement amount of the needle valve 54 along the axial direction (in the direction of arrows C and D), is proportional to the flow rate of the pressure fluid that flows through the communication chamber 36 to the side of the second port 14. Stated otherwise, by controlling the displacement amount of the needle valve 54, the flow rate of the pressure fluid is controlled.

Further, by turning the handle 20 and moving the first control surface 90 of the needle valve 54 to a position facing the seat portion 78, the flow rate of the pressure fluid that flows between the seat portion 78 and the first control surface 90, which is set at an angle of inclination larger than that of the second control surface 92, can be further increased.

On the other hand, in the case that the flow rate of the pressure fluid is decreased, the handle 20 is rotated in an opposite direction to that described above, whereby the needle valve 54 is moved downward (in the direction of arrow C) along the valve holder 50. As a result, the control member 88 approaches the seat portion 78, and since the gap between the control member 88 and the seat portion 78 gradually becomes smaller, the flow rate of the pressure fluid that flows through the gap to the downstream side is decreased. In addition, by further rotating the handle 20 so that the lower end of the stopper 94 in the needle valve 54 abuts against the seat portion 78, downward movement of the needle valve 54 is regulated, resulting in a totally closed condition in which the second control surface 92 of the control member 88 is in abutment against the seat portion 78.

In this manner, fluid controlled at a predetermined flow rate in the flow rate control valve 10 is supplied to another fluid pressure apparatus from the second port 14 via the tube 31*b*, whereby operations of the fluid pressure apparatus are controlled.

In the foregoing manner, in the present embodiment, the flat plate member 28 is disposed at a position upward of the body 16, with the plate member 28 being disposed on one end side only of the body 16. Consequently, due to the plate member 28, the one end side and the other end side of the flow rate control valve 10 can easily be confirmed with certainty. Along therewith, the flow direction of fluid that flows through the interior of the flow rate control valve 10 can be confirmed.

Further, since the flow direction of the fluid in the flow rate control valve 10 can be confirmed by the plate member 28, when the flow rate control valve 10 is installed, erroneous installation of the flow rate control valve 10 in a mistaken direction can be prevented. More specifically, the plate member 28 functions as a directivity means (direction-indicating means), by which the installation direction of the flow rate control valve 10 and the flow direction of the fluid can be confirmed.

Furthermore, for example, by pasting a discriminating label or the like on the upper surface of the plate member 28, even in the event that the flow rate control valve 10 is used together with other flow rate control valves as part of a manifold, a desired flow rate control valve 10 can easily and reliably be confirmed.

In addition, because the upper surface of the plate member 28 is flat, when the discriminating label is pasted on the surface of the plate member 28, the discriminating label is suitably kept attached. In other words, the surface of the plate member 28 is made not into a curved shape but into a flat shape such that a label or the like pasted thereon is not peeled off easily and is kept attached suitably.

Still further, because the flat recess 32, which is recessed from the outer circumferential surface, is disposed on only one side of the first cylindrical section 22, by confirming the position of the recess 32, the installation direction of the flow rate control valve 10 and the flow direction of fluid flowing through the flow rate control valve 10 can easily and reliably be confirmed from the exterior.

Figure 6:
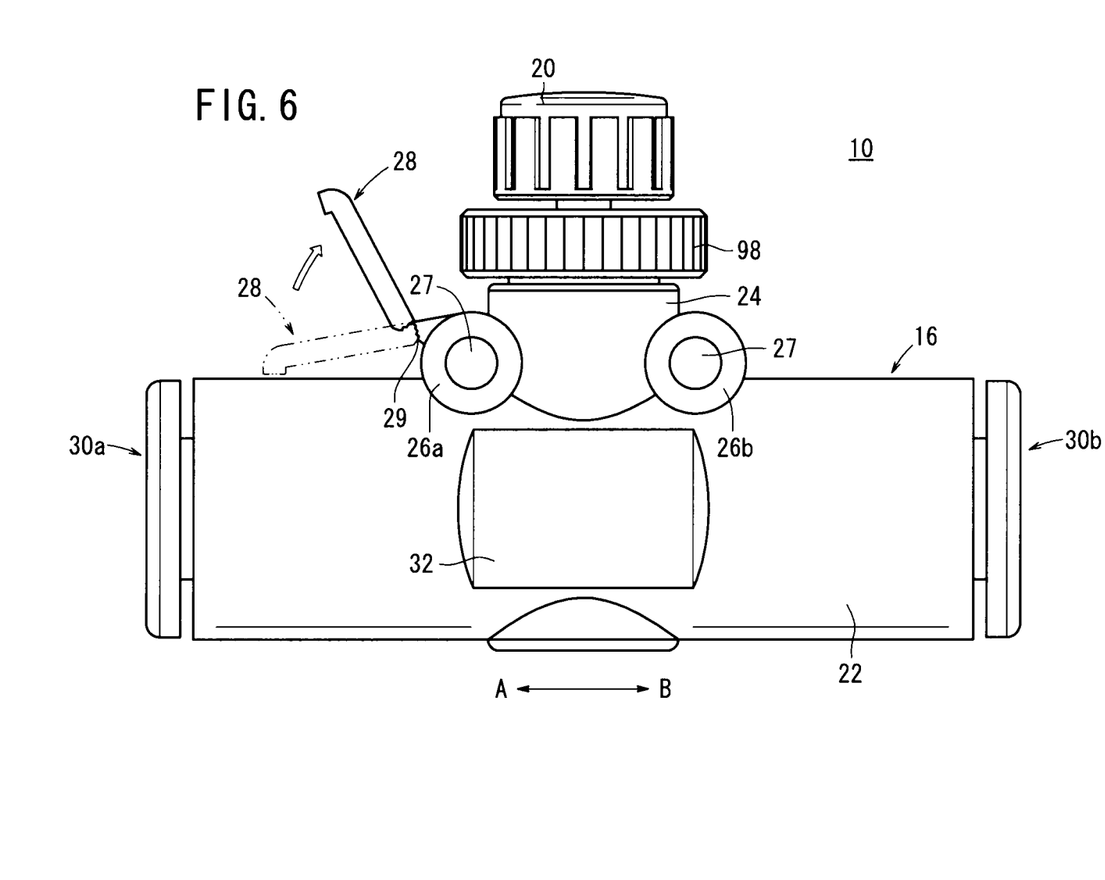
FIG. 6 is an external side view showing a condition in which a plate member is folded upwardly about a cutout portion, in the flow rate control valve of FIG. 2.

Further, in the case that the flow rate control valve 10 is installed in a narrow space, such as a holder or a wall portion, for example, the plate member 28, which is disposed above the first cylindrical section 22, comes into contact therewith, which tends to make mounting and installation of the flow rate control valve 10 difficult. Even in such a case, as shown in FIG. 6, by gripping the other end of the plate member 28 and imposing a force to cause upward rotation of the other end side about the cutout portion 29, the plate member 28 fractures away from the cutout portion 29 and becomes bent or folded upward. Owing thereto, the plate member 28 can be separated easily from the body 16, so that the flow rate control valve 10 from which the plate member 28 has been removed can be installed in a desired position.

The flow rate control valve according to the present invention is not limited to the above embodiment, but various other structures may be adopted as a matter of course without departing from the essence of the invention.

The invention claimed is:

1. A flow rate control valve comprising:
an elongated body having a port at each end of the body, and a fluid flow passage extending through the body and between the ports;
a valve member provided in the body and mounted to a rod provided to the body so as to be displaceable in a direction of the rod axis, whereby the valve member is thereby displaced in the body by displacement of the rod in the direction of the rod axis, wherein the valve member is positioned in the body with respect to the flow passage such that the displacement of the valve member controls the flow rate of a fluid flowing in the flow passage from one of the ports to the other of the ports;
a flat plate shaped member disposed at the circumference of the body such that the flat plate shaped member has a first flat plate surface facing toward the circumference of the body and a second flat plate surface facing away from the circumference of the body, wherein the first and second flat plate surfaces are separated by the thickness of the flat plate shaped member, and wherein the flat plate shaped member is cantilever mounted to the body at one end of the flat plate shaped member;
a cutout portion which is cut in the first flat plate surface of the flat plate shaped member to extend from the first flat plate surface in the thickness direction of the flat plate shaped member, wherein the thickness direction is a direction from the first flat plate surface perpendicularly toward the second flat plate surface, and wherein the cutout portion is disposed in the vicinity of the one end so as to reduce the thickness of the flat plate shaped member at said one end.

2. The flow rate control valve according to claim 1, further comprising a label pasted on the flat plate shaped member.

3. The flow rate control valve according to claim 1, further comprising a character written on the flat plate shaped member.

* * * * *